(12) United States Patent
Rakshit et al.

(10) Patent No.: US 10,976,704 B2
(45) Date of Patent: Apr. 13, 2021

(54) FINGERPRINT AUTHENTICATION DURING HOLOGRAPHIC OBJECT DISPLAY

(71) Applicant: INTERNATIONAL BUSINESS MACHINES CORPORATION, Armonk, NY (US)

(72) Inventors: Sarbajit K. Rakshit, Kolkata (IN); Sathya Santhar, Ramapuram (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 282 days.

(21) Appl. No.: 16/038,136

(22) Filed: Jul. 17, 2018

(65) Prior Publication Data

US 2020/0026237 A1 Jan. 23, 2020

(51) Int. Cl.
*G03H 1/00* (2006.01)
*G06K 9/00* (2006.01)
(Continued)

(52) U.S. Cl.
CPC .......... *G03H 1/0011* (2013.01); *G06F 3/016* (2013.01); *G06F 3/04815* (2013.01);
(Continued)

(58) Field of Classification Search
CPC ...... G03H 1/00; G03H 1/0005; G03H 1/0011; G03H 1/2249; G03H 2001/0061;
(Continued)

(56) References Cited

U.S. PATENT DOCUMENTS

| 8,500,284 B2 * | 8/2013 | Rotschild | G06F 3/0304 353/10 |
| 8,781,181 B2 * | 7/2014 | Rowe | G06K 9/00033 382/124 |

(Continued)

OTHER PUBLICATIONS

Sandra Swanson, "Fingerprints Go the Distance", [online], [retrieved on May 29, 2018]. Retrieved from the Internet: <https://www.technologyreview.com/s/422400/fingerprints-go-the-distance/>.

(Continued)

*Primary Examiner* — Stephone B Allen
*Assistant Examiner* — Jyotsna V Dabbi
(74) *Attorney, Agent, or Firm* — Law Offices of Ira D. Blecker, P.C.

(57) ABSTRACT

A display apparatus including a display; a holographic projector a fingerprint scanner to read a fingerprint from a user's finger spaced from the fingerprint scanner when placed in proximity to the holographic object; a camera to image the holographic object and the user's finger; a non-transitory storage medium that stores instructions; and a processor that executes the instructions including: responsive to the receipt of images from the camera, perform image analysis to identify a position of the user's finger with respect to the display surface and the holographic object, identify a position of the holographic object with respect to the display surface and identify the proximity of the user's finger with the holographic object; and responsive to the image analysis to identify the proximity of the user's finger with the holographic object, provide an input to the fingerprint scanner to read the fingerprint of the user's finger.

20 Claims, 4 Drawing Sheets

(51) Int. Cl.
*G06F 3/01* (2006.01)
*G06T 7/73* (2017.01)
*G06F 3/0481* (2013.01)

(52) U.S. Cl.
CPC ............ *G06K 9/00033* (2013.01); *G06T 7/73* (2017.01); *G03H 2001/0061* (2013.01)

(58) Field of Classification Search
CPC ... G03H 2001/0016; G03H 2001/0077; G03H 2226/05; G06T 7/70; G06T 7/73; G06T 19/003; G06F 3/00; G06F 3/01; G06F 3/011; G06F 3/016; G06F 3/017; G06F 3/04815; G06F 3/0227; G06F 3/03; G06F 3/0488; G06F 3/04883; G06F 3/0602; G06F 3/0601; G06F 3/062; G06F 3/0622; G06F 3/0637; G06F 3/0304; G06F 3/03547; G06F 1/1673; G06F 2203/04101; G06F 13/00; G06F 3/038; G06F 21/00; G06F 2203/338; G06K 9/00; G06K 9/00033; G06K 9/00006; G06K 9/00013; G06K 9/0002; G06K 9/00201; G06K 9/00335; G06K 9/00355; G06K 2009/0006; G06K 19/0718; G06K 19/0734; G06K 2209/00; G07C 9/00; G07C 9/25; G07C 9/257; G02B 27/017; G02B 27/0093; G02B 27/0172; G02B 2027/0174; G02B 2027/0187; G02B 2027/0138
USPC .......................................................... 359/2
See application file for complete search history.

(56) References Cited

U.S. PATENT DOCUMENTS

| 8,847,919 | B2 | 9/2014 | Krah | |
|---|---|---|---|---|
| 9,661,272 | B1* | 5/2017 | Daniel | .................... H04N 7/15 |
| 2009/0102603 | A1 | 4/2009 | Fein et al. | |
| 2014/0044323 | A1 | 2/2014 | Abramovich et al. | |
| 2014/0173721 | A1 | 6/2014 | Shenfield et al. | |
| 2015/0220058 | A1 | 8/2015 | Mukhtarov et al. | |
| 2015/0309316 | A1* | 10/2015 | Osterhout | ............. G06F 3/0346 345/8 |
| 2016/0239080 | A1 | 8/2016 | Marcolina et al. | |
| 2017/0068213 | A1* | 3/2017 | Rhee | ...................... G06F 3/011 |

OTHER PUBLICATIONS

"Apple's display tech lets users interact with 3D objects in mid-air", [online], [retrieved on May 17, 2018]. Retrieved from the Internet: <http://appleinsider.com/articles/14/04/24/apples-display-tech-lets-users-interact-with-3d-objects-in-mid-air>.

Luke Edwards, "Holograms are finally here: Plasma lasers used to create images in mid-air", [online], [retrieved on May 17, 2018]. Retrieved from the Internet: <www.pocket-lint.com/news/131622-holograms-are-finally-here-plasma-lasers-used-to-create-images-in-mid-air>.

Lee Roop, "IDair's new fingerprint reader captures prints from 6 meters away", [online], [retrieved on May 29, 2018]. Retrieved from the Internet: <http://blog.al.com/breaking/2012/06/idairs_new_fingerprint_reader.html>.

Leon Doitscher,"LG is taking holograms mobile", [online], [retrieved on May 29, 2018]. Retrieved from the Internet: <http://declassifiled.com/2015/10/lg-is-taking-holograms-mobile/>.

Mary-Ann-Russon,"Touchable 3D holograms in daylight now possible using superfast femtosecond lasers", online], [retrieved on May 17, 2018]. Retrieved from the Internet: <s://www.ibtimes.co.uk/touchable-3d-holograms-daylight-now-possible-using-superfast-femtosecond-lasers-1508599>.

Malarie Gokey, "This 3D fingerprint sensor uses ultrasound scanning to hold your data tight", [online], [retrieved on May 29, 2018]. Retrieved from the Internet: https://www.digitaltrends.com/mobile/qualcomm-sense-id-ultrasound-fingerprint-sensor/>.

* cited by examiner

FINGERPRINT AUTHENTICATION DURING HOLOGRAPHIC OBJECT DISPLAY

BACKGROUND

The present exemplary embodiments pertain to holographic displays in which the displayed object is a three dimensional holographic image and, more particularly, to authentication of a user so as to permit interaction of the user with the three dimensional holographic image.

Next generation computer systems may use holographic objects for various user interactions. The user may have the feeling of interacting with digital objects while performing any activity with the physical objects.

BRIEF SUMMARY

The various advantages and purposes of the exemplary embodiments as described above and hereafter are achieved by providing, according to an aspect of the exemplary embodiments, a display apparatus for fingerprint authentication during holographic object display comprising: a display having a display surface; a holographic projector to display a holographic object above and spaced from the display surface; a fingerprint scanner to read a fingerprint from a user's finger spaced from the fingerprint scanner when placed in proximity to the holographic object; a camera to image the holographic object and the user's finger; a non-transitory storage medium; and a processor that executes the instructions. The processor executes the instructions to: responsive to the receipt of images from the camera, perform image analysis to: identify a position of the user's finger with respect to the display surface and the holographic object, identify a position of the holographic object with respect to the display surface and identify the proximity of the user's finger with the holographic object; and responsive to the image analysis to identify the proximity of the user's finger with the holographic object, provide an input to the fingerprint scanner to read the fingerprint of the user's finger.

According to another aspect of the exemplary embodiments, there is provided a computer-implemented method for fingerprint authentication during holographic object display comprising: displaying by a holographic projector a holographic object above and spaced from a display surface of a display; reading by a fingerprint scanner a fingerprint from a user's finger spaced from the fingerprint scanner when placed in proximity to the holographic object; performing by a camera an image analysis identifying: a position of the user's finger with respect to the display surface and the holographic object, a position of the holographic object with respect to the display surface and the proximity of the user's finger with the holographic object; responsive to identifying by the camera the proximity of the user's finger with the holographic object, providing an input to the fingerprint scanner to read the fingerprint of the user's finger; reading by the fingerprint scanner the fingerprint of the user's finger in proximity with the holographic object; and a processor to perform the method.

According to a further aspect of the exemplary embodiments, there is provided a computer program product for fingerprint authentication during holographic object display, the computer program product comprising a computer readable storage medium having program instructions embodied therewith, the program instructions executable by a processor to cause the processor to perform a method comprising: displaying by a holographic projector a holographic object above and spaced from a display surface of a display; reading by a fingerprint scanner a fingerprint from a user's finger spaced from the fingerprint scanner when placed in proximity to the holographic object; performing by a camera an image analysis identifying: a position of the user's finger with respect to the display surface and the holographic object, a position of the holographic object with respect to the display surface and a proximity of the user's finger with the holographic object; responsive to identifying by the camera the proximity of the user's finger with the holographic object, providing an input to the fingerprint scanner to read the fingerprint of the user's finger; and reading by the fingerprint scanner the fingerprint of the user's finger in proximity with the holographic object.

BRIEF DESCRIPTION OF SEVERAL VIEWS OF THE DRAWINGS

The features of the exemplary embodiments believed to be novel and the elements characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION

Figure 1:
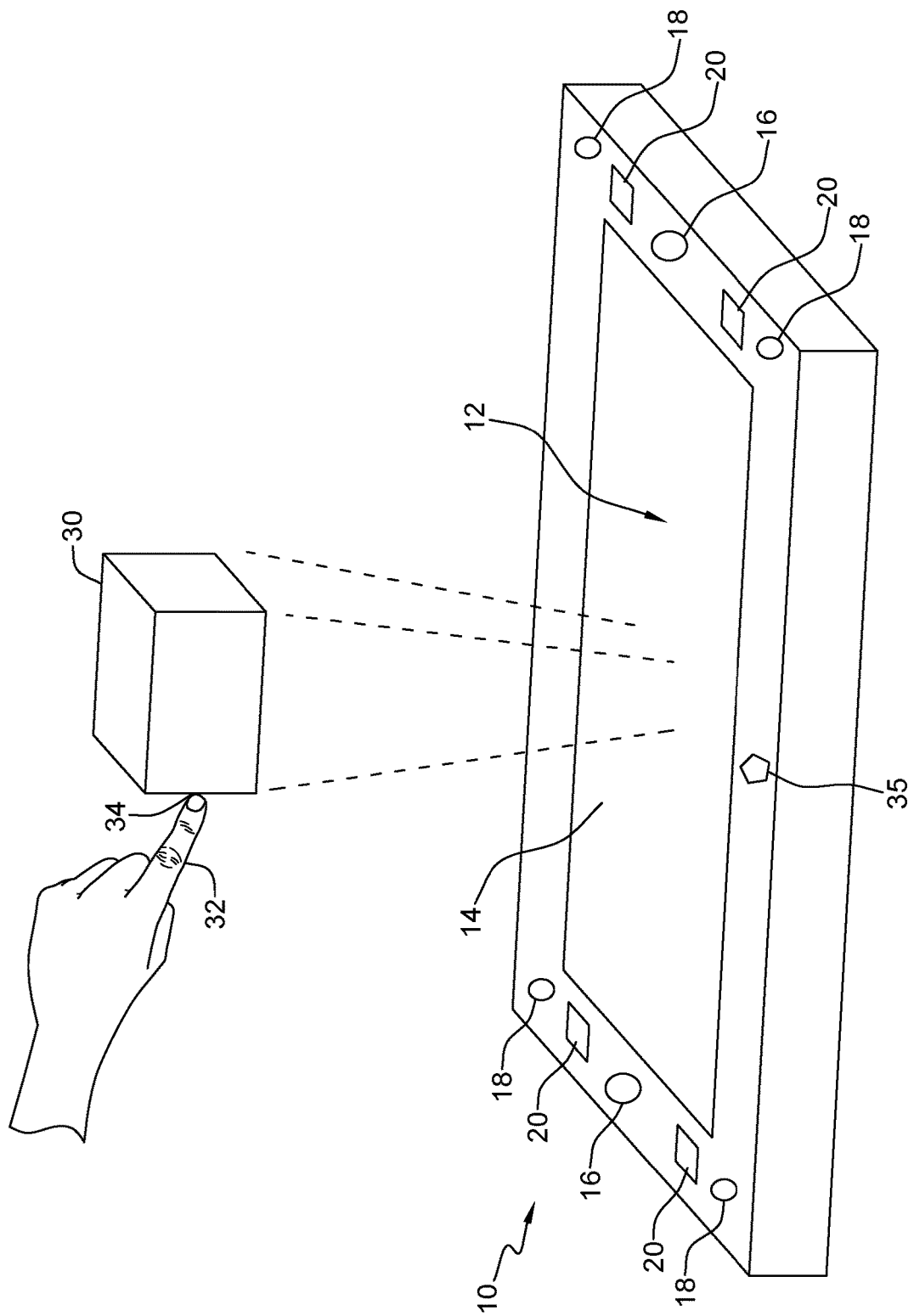
FIG. 1 illustrates an exemplary electronic device in which there may be a display which may display typical digital images but may also display holographic images.

Next generation computing systems may use holographic objects for various user interactions. Through the holographic objects, the user may unlock the computing system, share information, interact with various other participating users etc. It would thus be important to have an authentication system while interacting with the holographic object. Some users may not be authorized to interact with one or more holographic objects or to execute a specific function, whereas other users may be authorized to interact with the same holographic object and/or execute the specific function. As the user may be interacting with the holographic object with the user's fingers, there is a need for a fingerprint authentication system while interacting with the holographic object.

The exemplary embodiments propose an apparatus, a method and a computer program product.

An electronic device may have a projected fingerprint scanner installed along with a holographic projector. While projecting any holographic object above a display surface of the electronic device, the electronic device may also have a capability to scan a user's fingerprint at or near the point where the user's finger touches the holographic object (i.e., touchpoint) by sharing the spatial coordinates of the holographic object with the fingerprint scanner.

A camera, and optionally additional sensors such as an ultrasonic sensor, installed in the electronic device may perform image analysis to identify the relative position of the user's fingers, holographic objects and the touch point of a user's finger on a holographic object. The fingerprint scanning function may be enabled if the holographic objects require authentication.

While the fingerprint scanner may be scanning the user's finger, the holographic object to be touched may be positioned by the holographic projector in such a way that the fingerprint scanner covers the entire scanning area of the user's finger and correspondingly the position of the fingerprint scanner may be auto adjusted to scan the user's finger at whatever may be the spatial position of the user's finger in the three dimensional (3D) space.

During the authentication process, software may validate the following information and, if authentication is successful, the user may interact with the holographic object:

Software may ensure the user's finger has touched a holographic object either by sensing the position of the user's finger in the 3D space or by using non-contact tactile feedback of holographic shapes;

Software may identify which holographic object is touched as there may be a plurality of holographic objects displayed;

Software may identify which side of the holographic object is touched; and

Authentication may be used to execute any action on the holographic object, such as changing position of the holographic object, rotating the holographic object, etc or application access such as accessing emails, folders and so on. The software may check if the user has sufficient right to execute the required interaction with the holographic object.

If the user is not authorized to perform the interaction on the selected holographic object, then audio and/or visual feedback may be provided, such as vibrating the holographic object, changing the color or brightness or emitting an audio based alert.

Referring to the Figures in more detail, and particularly referring to FIG. 1, there is illustrated an exemplary electronic device 10 in which there may be a display 12 which may display typical digital images but may also display holographic images such as 3D holographic object 30. The holographic object 30 is a simple shape in the form of a cube but it should be understood that more complex images may be formed. Further, while holographic object 30 is displayed in FIG. 1, there may be a plurality of holographic objects 30 formed. Such holographic objects 30 may be, for example, a keypad or a set of file folders.

The display 12 may have a display surface 14. For purposes of illustration and not limitation, the electronic device 10 is a smartphone but could also be any electronic device having a display such as a tablet or a laptop.

The electronic device 10 may include one or more cameras 16 for taking pictures but also having the capability to image objects and through software to perform image analysis of the objects. The electronic device 10 may further include a plurality of holographic projectors 18 which may project a holographic object 30 above the display surface 14. Some of the holographic projectors 18 may be on one side of the display 12 while other of the holographic projectors 18 may be on the other side of the display 12.

The electronic device 10 may further include one or more projection fingerprint scanners 20, hereafter just fingerprint scanners 20, which may read the fingerprint of a user's finger that is in proximity to the holographic object 30. That is, the fingerprint scanners are noncontact fingerprint scanners as they may be able to read a user's fingerprint spaced above the display surface 14.

The fingerprint scanners 20 may be able to read the user's fingerprint at any location in range of the fingerprint scanners 20, which may be several feet away from the fingerprint scanners 20. For purposes of the exemplary embodiments, it is only necessary to be able to read a user's fingerprint when the user's finger 32 has actually touched the holographic object 30 at 34, known as a touchpoint, or at least in very close proximity to the holographic objects 30, say within a couple of millimeters.

The threshold for when the user's fingerprint is read may be configured by the user. A threshold of, for example, 2 millimeters may be a reasonable threshold so that when the user's finger 32 is 2 millimeters or less from the holographic objects 30 the user's fingerprint is read but when the user's finger 32 is more than 2 millimeters from the holographic objects 30, the user's fingerprint is not read.

The fingerprint scanners 20 may work by a photographic process in which an image of a fingerprint may be photographically captured using polarized light and then the image is processed to sharpen the image.

Figure 2:
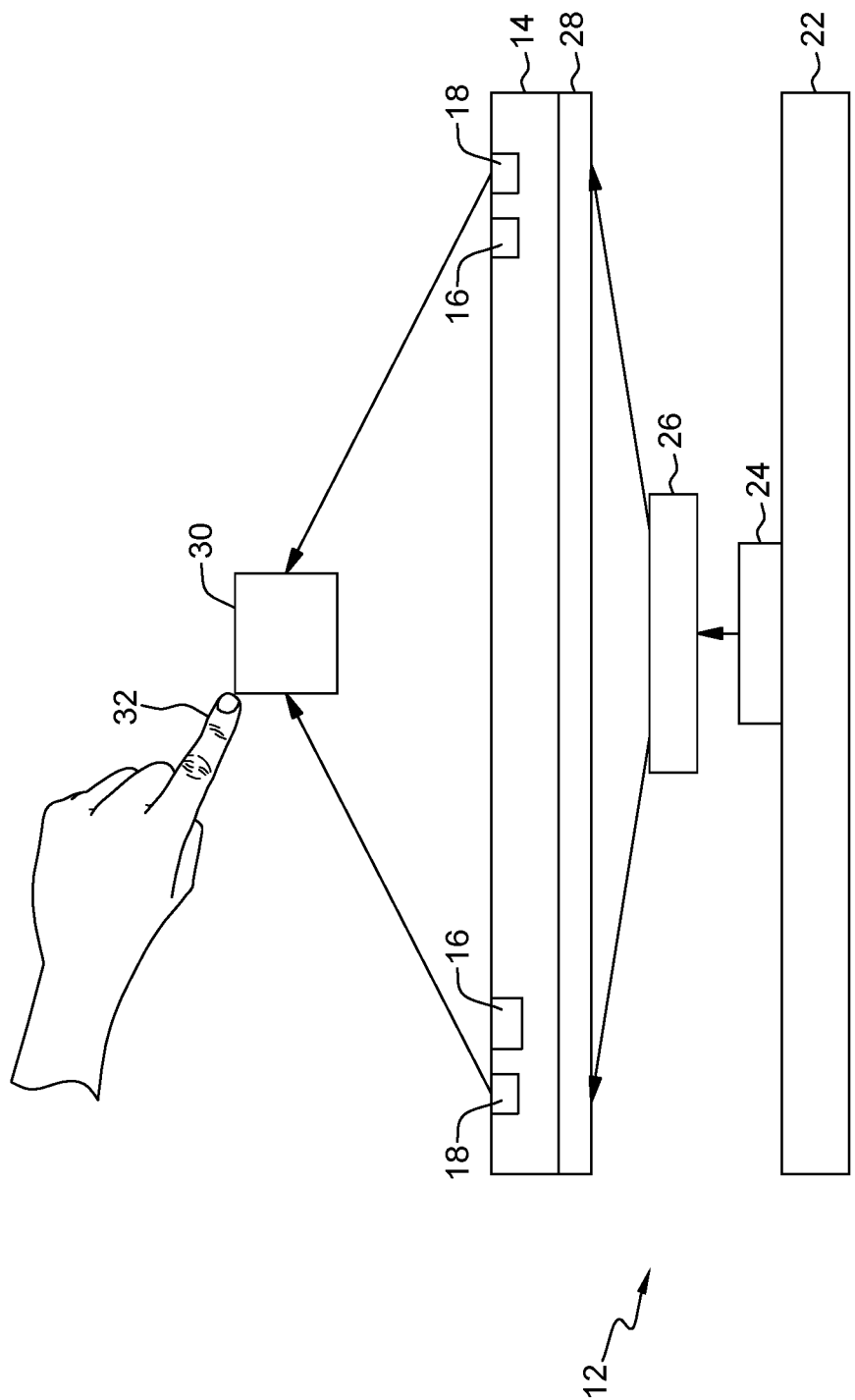
FIG. 2 is an elevation view conceptually illustrating the components of the display in FIG. 1 which may have the capability to display holographic objects.

FIG. 2 is an elevation view conceptually illustrating the components of display 12 which may have the capability to display holographic objects. The display 12 may have a body 22 on which is supported a light source 24. Preferably the light source 24 is a coherent light source such as a laser. Located in line with the light source 24 is an image hologram 26 which may display a three dimensional holographic object 30 when illuminated by the light source 24. "Three-dimensional holographic object" 30 refers to a complete three-dimensional image in which, when a displayed image is viewed from a variety of directions, the image appears to be three-dimensional.

The image hologram 26 of the 3D holographic object 30 may be projected onto lens 28 which then focuses the 3D holographic object 30 (hereafter just "holographic object") to be displayed above display surface 14 by holographic projectors 18. Also shown on display surface 14 are cameras 16.

As indicated earlier, it may be desirable or necessary to control access to the holographic object 30 since the holographic object 30 may control access to certain functions or applications in the electronic device 10. Further, the holographic object 30 may be subject to manipulation by the user so access to the holographic object 30 may be desirable. Accordingly, authentication of a user's fingerprint indicating that the user has sufficient right to execute the required interaction with the holographic object 30 may be required before the user is able to access the holographic object 30.

Authentication of a user's fingerprint may be accomplished by a combination of the cameras 16, the fingerprint scanners 20 and image processing of the user's fingerprint.

The cameras 16 image the holographic object 30 and the user's finger 32. Image analysis is performed on the images of the holographic object 30 and the user's finger to identify a position of the user's finger 32 with respect to the display surface 14, a position of the user's finger 32 with respect to the holographic object 30 and also a position of the holographic object 30 with respect to the display surface 14. If there is more than one holographic object 30, image analysis will also indicate which holographic object 30 the user's finger 32 is about to touch.

Since reading of the user's fingerprint may be triggered when the user's finger 32 is in proximity to the holographic object 30, image analysis may also identify a touchpoint of the user's finger on the holographic object. In one embodiment, reading of the user's fingerprint may also be triggered when the user's finger 32 is in close proximity to the holographic object 30, say 2 millimeters or less.

Instead of using the cameras 16 and imaging analysis, the proximity of the user's finger to the holographic object 30 may be based on ultrasound to avoid interaction of light from the holographic image and the photons from the user's finger. In this case, the electronic device 10 may contain one or more ultrasound sensors 35 to sense the proximity of the user's finger 32 to the holographic object 30.

Once the image analysis has indicated that the user's finger 32 touched the holographic object 30, or in one embodiment is in close proximity to the holographic object 30, an input may be provided to the fingerprint scanner 20 to read the fingerprint of the user's finger 32.

Subsequent to reading of the user's fingerprint, the user's fingerprint may be converted to a user's identity and then checked against an authorization database. If the user is authorized, authentication is successful, the holographic object 30 may be "unlocked" and the user may be permitted to access the holographic object 30 to the extent authorized. Authorization may be full or partial as determined by the user's permission access in the authorization database.

If the user is not authorized, authentication has failed, the holographic object 30 may remain "locked" and the user will not be permitted to access the holographic object 30 in any way.

Figure 3:
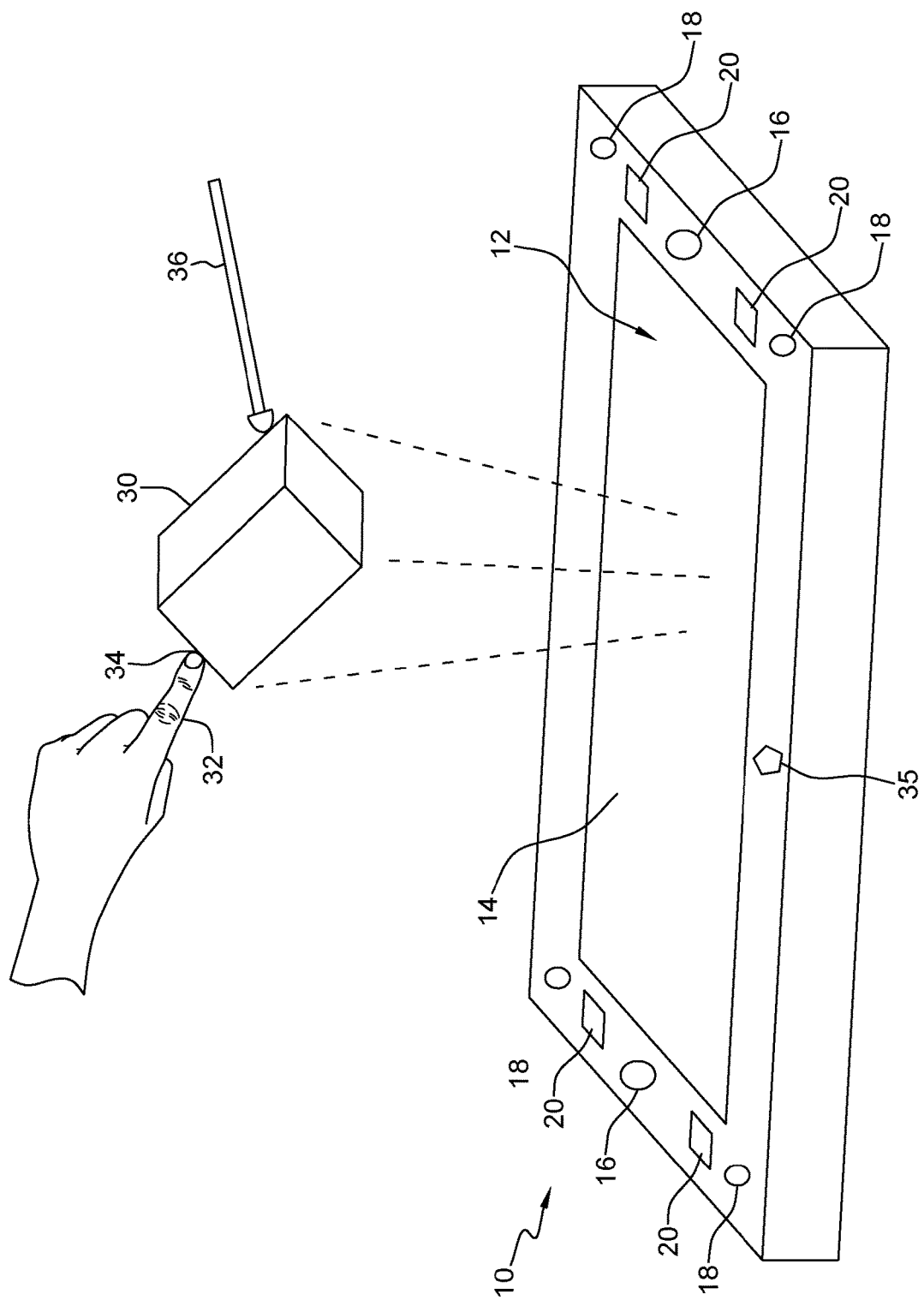
FIG. 3 illustrates the exemplary electronic device of FIG. 1 in which the user has been successfully authenticated and authorized to interact with a holographic object.

Referring now to FIG. 3, the user has been successfully authenticated and authorized to interact with the holographic object 30. Holographic object 30 has been moved to a new location consistent with an interaction with the user. When interacting with the holographic object 30, the user may continue to use the user's finger 32 or may use another object such as a stylus 36 to interact with the holographic object 30.

Figure 4:
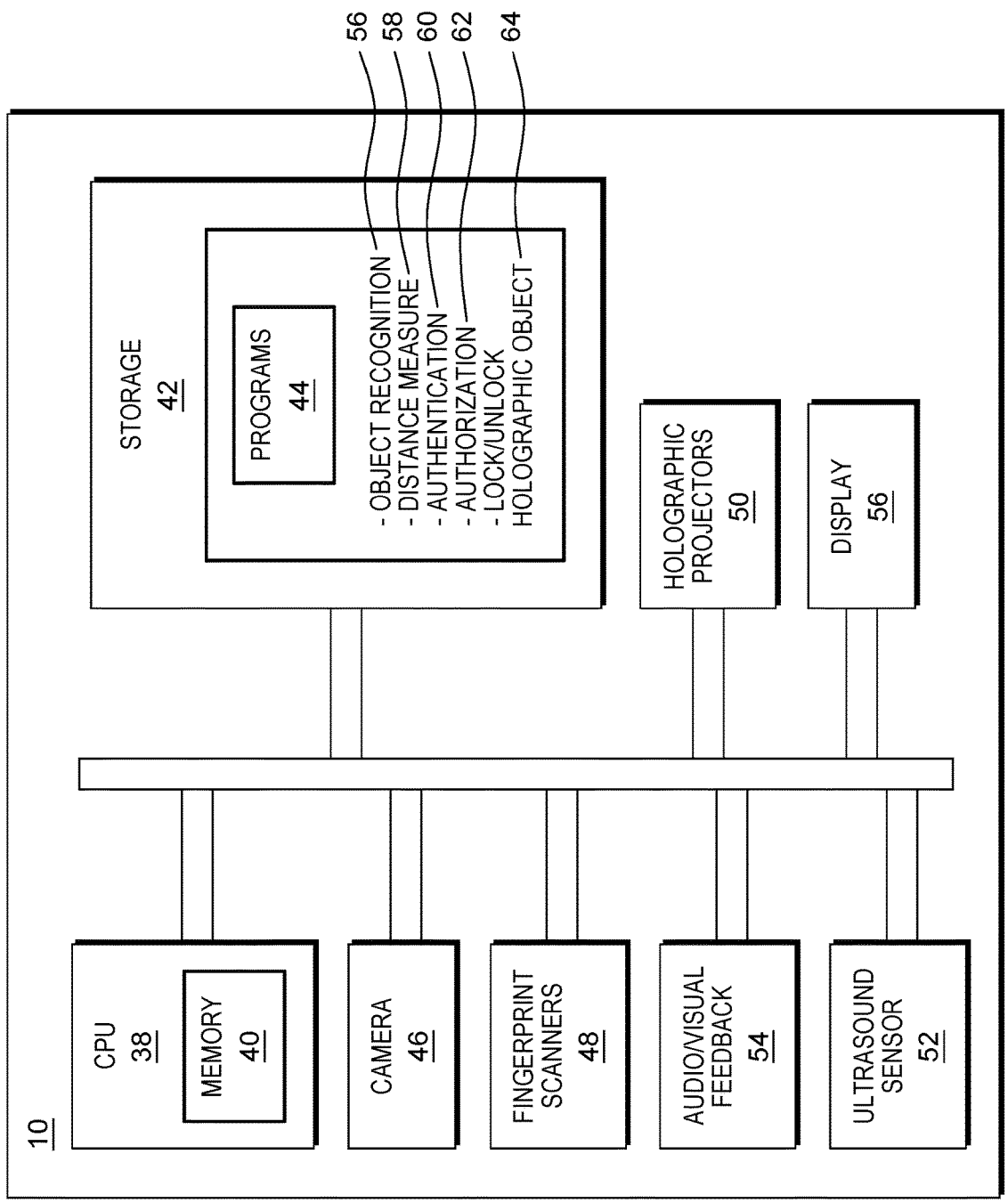
FIG. 4 illustrates details of the electronic device of FIG. 1.

FIG. 4 illustrates details of the electronic device 10. Included within the electronic device 10 may be a processor such as central processing unit (CPU) 38 having memory 40. Also included within electronic device 10 may be storage 42 having computer programs 44. Storage may be resident within the electronic device 10 or may be remotely located such as in the cloud. Among the computer programs 44 may be an object recognition program 56 to receive input from the camera 16 and process the images received from the camera 16.

The electronic device 10 may further include camera instructions 46 to operate the camera 16. Further included within computer programs 44 may be additional computer programs for operating the camera 16 including a distance measuring program 58 to measure the distance between the user's finger 32 and the display surface 14, to measure the distance between the user's finger 32 and the holographic object 30 and to measure the distance between the holographic object 30 and the display surface 14.

Also included within electronic device 10 may be fingerprint scanner instructions 48 to operate the fingerprint scanners 20, holographic projector instructions 50 to operate the holographic projectors 18, ultrasound sensor instructions 52 to operate the ultrasound sensor, if present, audio/visual feedback instructions 54 to provide audio and/or visual feedback if authentication of the user's fingerprint is unsuccessful and display instructions 56 to operate the display 12.

Regarding authentication, computer programs 44 may further include authentication programs 60 to provide the necessary functions for authentication, authorization programs 62 to check a database (not shown) for a user's level of authorization to access the holographic object 30 locking/unlocking programs 64 to unlock a holographic object 30 if authorization to access the holographic object 30 is permitted and to lock the holographic object 30 after the user is done interacting with the holographic object or after a time-out period has been passed.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent to those skilled in the art having regard to this disclosure that other modifications of the exemplary embodiments beyond those embodiments specifically described here may be made without departing from the spirit of the invention. Accordingly, such modifications are considered within the scope of the invention as limited solely by the appended claims.

What is claimed is:

1. A display apparatus for fingerprint authentication during holographic object display comprising:
   a display having a display surface;
   a holographic projector to display a holographic object above and spaced from the display surface;
   a fingerprint scanner to read a fingerprint from a user's finger spaced from the fingerprint scanner and placed in proximity to the holographic object;
   a camera to image the holographic object and the user's finger;
   a non-transitory storage medium that stores instructions; and
   a processor that executes the instructions comprising:
      responsive to the receipt of images from the camera, perform image analysis to identify a position of the user's finger with respect to the display surface and the holographic object, identify a position of the holographic object with respect to the display surface and identify the proximity of the user's finger with the holographic object; and
      responsive to the image analysis to identify the proximity of the user's finger with the holographic object, provide an input to the fingerprint scanner to read the fingerprint of the user's finger.

2. The apparatus of claim 1 further comprising:
   the non-transitory storage medium further stores instructions comprising:
   responsive to input from the fingerprint scanner, provide an authentication of the fingerprint;
   responsive to a successful authentication of the fingerprint, unlock the holographic object for an interaction of the holographic object with an interactive object; and
   responsive to an unsuccessful authentication of the fingerprint, maintain a lock of the holographic object to prevent the interaction of the holographic object with an interactive object.

3. The apparatus of claim 2 wherein the authentication comprises an identification of an authorization level of the user to interact with the holographic object and the interactions with the holographic object permitted by the authorization level of the user.

4. The apparatus of claim 2 wherein the non-transitory storage medium further stores instructions to provide an audio and/or visual feedback responsive to an unsuccessful authentication of the fingerprint.

5. The apparatus of claim 2 wherein the interactive object is the user's finger or an inanimate object.

6. The apparatus of claim 2 further comprising a sensor to sense tactile feedback of the proximity of the user's finger in contact with the holographic object.

7. The apparatus of claim 6 wherein the sensor utilizes ultrasound to sense the tactile feedback.

8. A computer-implemented method for fingerprint authentication during holographic object display comprising:

displaying by a holographic projector a holographic object above and spaced from a display surface of a display;

reading by a fingerprint scanner a fingerprint from a user's finger spaced from the fingerprint scanner and placed in proximity to the holographic object;

performing by a camera an image analysis identifying: a position of the user's finger with respect to the display surface and the holographic object, a position of the holographic object with respect to the display surface and the proximity of the user's finger in contact with the holographic object;

responsive to identifying by the camera the proximity of the user's finger with the holographic object, providing an input to the fingerprint scanner to read the fingerprint of the user's finger;

reading by the fingerprint scanner the fingerprint of the user's finger in proximity with the holographic object; and a computer processor to perform the method.

9. The apparatus of claim 8 further comprising:

responsive to input from the fingerprint scanner, providing an authentication of the fingerprint;

responsive to a successful authentication of the fingerprint, unlocking the holographic object for an interaction of the holographic object with an interactive object; and responsive to an unsuccessful authentication of the fingerprint, maintaining a locking of the holographic object to prevent the interaction of the holographic object with an interactive object.

10. The method of claim 9 wherein the authentication comprises identifying an authorization level of the user to interact with the holographic object and interactions with the holographic object permitted by the authorization level of the user.

11. The method of claim 9 further providing an audio and/or visual feedback responsive to an unsuccessful authentication of the fingerprint.

12. The method of claim 9 wherein the interactive object is the user's finger or an inanimate object.

13. The method of claim 9 further comprising sensing by a sensor to sense tactile feedback of the touchpoint of the user's finger in contact with the holographic object.

14. The method of claim 13 wherein the sensing utilizes ultrasound to sense the tactile feedback.

15. A computer program product for fingerprint authentication during holographic object display, the computer program product comprising a computer readable storage medium having program instructions embodied therewith, the program instructions executable by a processor to cause the processor to perform a method comprising:

displaying by a holographic projector a holographic object above and spaced from a display surface of a display;

reading by a fingerprint scanner a fingerprint from a user's finger spaced from the fingerprint scanner and placed in proximity to the holographic object;

performing by a camera an image analysis identifying: a position of the user's finger with respect to the display surface and the holographic object, a position of the holographic object with respect to the display surface and the proximity of the user's finger with the holographic object;

responsive to identifying by the camera the proximity of the user's finger with the holographic object, providing an input to the fingerprint scanner to read the fingerprint of the user's finger; and reading by the fingerprint scanner the fingerprint of the user's finger in proximity with the holographic object.

16. The computer program product of claim 15 further comprising:

responsive to input from the fingerprint scanner, providing an authentication of the fingerprint;

responsive to a successful authentication of the fingerprint, unlocking the holographic object for an interaction of the holographic object with an interactive object; and responsive to an unsuccessful authentication of the fingerprint, maintaining a locking the holographic object to prevent the interaction of the holographic object with an interactive object.

17. The computer program product of claim 16 wherein the authentication comprises identifying an authorization level of the user to interact with the holographic object and the interactions with the holographic object permitted by the authorization level of the user.

18. The computer program product of claim 16 further providing an audio and/or visual feedback responsive to an unsuccessful authentication of the fingerprint.

19. The computer program product of claim 16 further comprising sensing by a sensor to sense tactile feedback of the proximity of the user's finger with the holographic object.

20. The computer program product of claim 19 wherein the sensing utilizes ultrasound to sense the tactile feedback.

* * * * *